No. 790,640. PATENTED MAY 23, 1905.
J. KIES.
CHECK CONTROLLED MEASURING DEVICE.
APPLICATION FILED SEPT. 1, 1904.
2 SHEETS—SHEET 1.
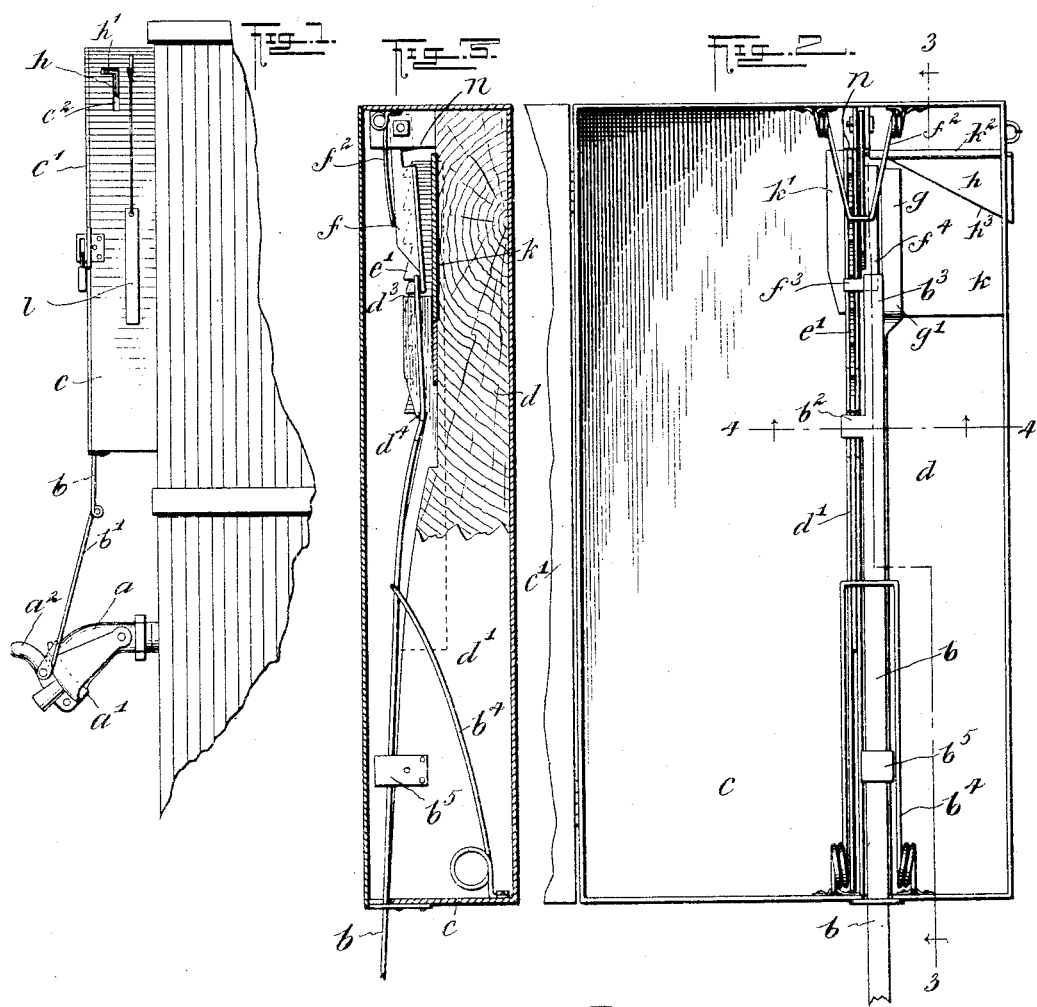
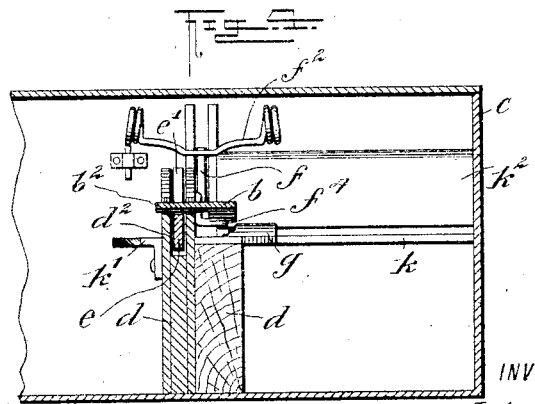
WITNESSES:
INVENTOR
John Kies
BY
ATTORNEYS No. 790,640. PATENTED MAY 23, 1905.
J. KIES.
CHECK CONTROLLED MEASURING DEVICE.
APPLICATION FILED SEPT. 1, 1904.
2 SHEETS—SHEET 2.
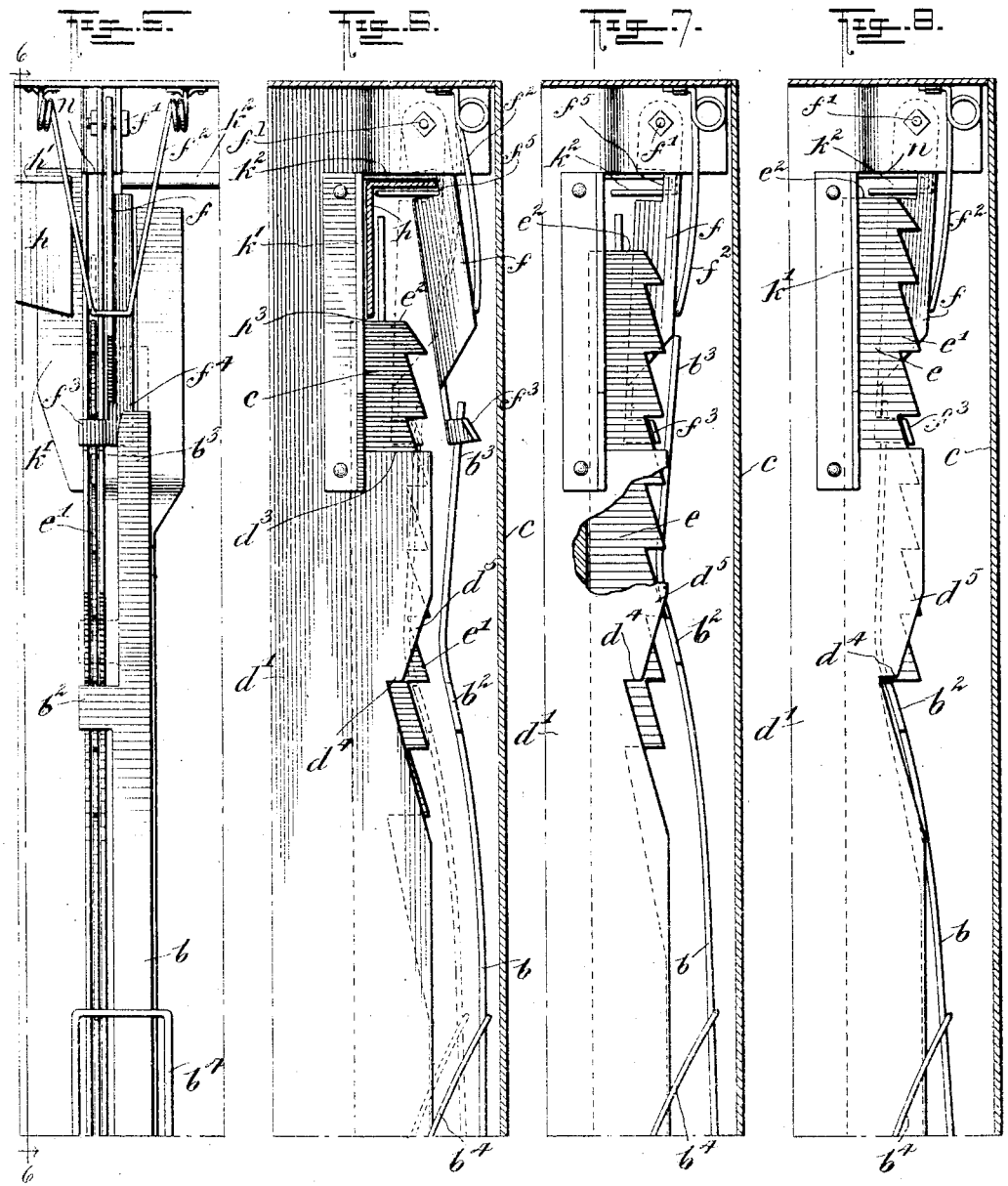
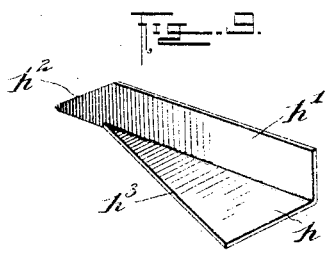
WITNESSES:
INVENTOR
John Kies
BY
ATTORNEYS No. 790,640. Patented May 23, 1905.

UNITED STATES PATENT OFFICE.

JOHN KIES, OF GREGOR, WISCONSIN.

CHECK-CONTROLLED MEASURING DEVICE.

SPECIFICATION forming part of Letters Patent No. 790,640, dated May 23, 1905.

Application filed September 1, 1904. Serial No. 222,973.

*To all whom it may concern:*

Be it known that I, JOHN KIES, a citizen of the United States, and a resident of Gregor, in the county of Kewaunee and State of Wisconsin, have invented a new and Improved Check-Controlled Measuring Device, of which the following is a full, clear, and exact description.

My invention relates to a check-controlled measuring device which is capable of general application, but is especially designed for the purpose of checking off milk to the patrons of the creamery by the pailful or in any equivalent manner.

The principal object of my invention is to provide means for the convenient and efficient measuring of liquids so controlled by a check that upon placing a check of the desired size in the machine a certain number of pails or other measures of liquid may be drawn and that the machine will then be locked, so that no more can be drawn until it is unlocked by the insertion of another check. It is designed so that the checks may be made of different sizes for the purpose of setting the machine to draw different numbers of measures of liquid.

Further objects of the invention will appear in the course of the description.

Reference is to be had to the accompanying drawings, forming a part of this specification, in which similar characters of reference indicate corresponding parts in all the figures.

Figure 1 is a side elevation of the structure, showing a preferred form of my invention in operative position. Fig. 2 is an interior view of the casing containing the works and showing a preferred form thereof. Fig. 3 is a sectional view on the line 3 3 of Fig. 2. Fig. 4 is a sectional view on the line 4 4 of Fig. 2. Fig. 5 is an enlarged view similar to Fig. 2 of a portion of the operating mechanism shown in a different position. Fig. 6 is a side elevation of the device shown in Fig. 5, the casing being shown in section. Fig. 7 is a view similar to Fig. 6 with the parts in a different position. Fig. 8 is also a view similar to Fig. 6 with the parts in the position assumed when they are locked, and Fig. 9 is a perspective view of a check which may be employed with my invention.

When the invention is to be used for the purpose of permitting a certain number of measures of liquid to be withdrawn—as, for example, a certain number of pails of milk—a faucet $a$ is provided which has a cap $a'$ and a lever $a^2$. The faucet is preferably of ordinary construction and so designed that upon lifting the lever $a^2$ the cap $a'$ will be displaced from the opening in the faucet and will permit milk to flow out. The person desiring the milk has a can on his wagon and draws the milk in a pail, which must be emptied before another pailful can be drawn. When his pail is full, he has to depress the lever $a^2$ or let the milk run on the ground. The lifting of the lever is designed to cause reciprocation of a bar $b$, connected with the lever by means of a connecting-rod $b'$.

The parts so far described are shown in Fig. 1. Reference is to be had to the other figures for an illustration of the embodiment of the operating mechanism which I prefer to employ, it being understood that the bar $b$ is raised every time the lever $a^2$ is raised and also drawn back with it. It will be obvious that the object of the invention is to control the operation of the bar $b$ so that upon placing a check of the desired size in the machine the bar can be raised and withdrawn the desired number of times, after which it will become locked. Another object is to cause the lifting of the lever $a^2$ to also reciprocate the bar $b$ the same distance and restore it to its original position. The bar is provided with a projection $b^2$ for operating other mechanism to be described. It also has an upwardly-extending end $b^3$ and is held down in position by means of a spring $b^4$ and guided by a loop $b^5$. The bar is preferably housed in a casing $c$, having a cover $c'$ and is mounted on a block $d$ within the casing. The casing is also provided with a slot $c^2$ for a purpose hereinafter stated.

$e$ is a ratchet-bar designed to freely slide along the edge of the block $d$ and between it and a side piece $d'$, attached to the block, the block $d$ and side piece $d'$ constituting ways for the slide $e$. The ratchet-bar $e$ is provided with teeth $e'$, with which the projection $b^2$ is designed to engage for the purpose of moving the ratchet-bar $e$.

$f$ is a locking device pivoted to the frame $c$ at the point $f'$ and held in operative position, by means of a spring $f^2$, against the teeth of the bar $e$. A projection $f^3$ is provided on the locking device for the purpose of engaging with the teeth $e'$ of the bar $e$ and preventing the ratchet-bar from falling back or from moving in a rearward direction. The locking device $f$ is also provided with a projection $f^4$, which has another function—namely, that of unlocking the machine—and is adapted to engage with the end $b^3$ of the bar $b$, as indicated in Fig. 6, so as to lift the bar $b$ out of engagement with the teeth of the ratchet-bar $e$.

$g$ is a projection attached to the block $d$ and having a curved portion $g'$ adapted to assure the upward motion of the end $b^3$ of the bar $b$ against the action of the spring $b^4$ when the bar is projected upwardly.

The check by which the machine is set is designated by the letter $h$, and its main body portion is triangular in form, having an inclined surface $h^3$ at one edge, while it has a projection $h'$ along its outer edge, provided with an inclined forward end $h^2$. This check is designed to slide over a platform $k$, which has a projection $k'$ upon the back side of the ways through which the bar $e$ is designed to reciprocate and also has an angular guide $k^2$ for the projection $h'$ of the check. The check is designed to be slipped into the frame to the position shown in Fig. 2 by hand and may then be pushed through the frame by means of a bar, such as that shown at $l$, or by any other convenient device, being guided by the guide $k^2$.

Before I describe and illustrate the particular embodiment of my invention, which shows it in practical form, it will be obvious that the invention itself is capable of improvement in many other forms and that it is not limited to that shown. The operation of the device as illustrated will now be described, it being understood that many improvements in the operation may also be made without departing from the scope of the invention or from the appended claims.

The person desiring to draw liquid will select a check $h$ of the desired size, which will obviously be provided with a numeral or other character indicating the number of pails or measures of liquid which it represents. He will force the check into the slot $c^2$ in the casing to the position shown in Fig. 2 and then by means of the bar $l$ or other equivalent device will further force the check in a straight line through the machine. It will be understood that before the check is applied the parts are in locked position, as shown in Figs. 3 and 8—that is, the bar $e$ will be at its highest position, the projection $b^2$ will be in engagement with the lowest tooth $e'$ of the ratchet-bar $e$, and the locking device $f$ will be down so that the projection $f^3$ engages with one of the teeth $e'$, while the projection $f^4$ is at its lowest position, so that it will not lift the end $b^3$ of the bar $b$ against the action of the spring $b^4$. It will be seen that when the parts are in this position the ratchet-bar $e$ cannot be raised, because the last tooth $e'$ forms a positive stop for the projection $b^2$ and the bar $b$. This forms a positive locking arrangement, which cannot be manipulated in any manner from the faucet. The forcing of the check along the platform $k$, however, will disarrange these parts, so as to permit the operation of the faucet. The first effect of the check will be to cause the inclined surface $h^2$ to engage with a notch $f^5$ upon the locking device $f$ and force the latter to swing upwardly upon its pivot $f'$. This will have two consequences: First, the projection $f^3$ will be disengaged from the tooth $e'$ and will be out of position for reëngagement with other teeth of the bar $e$. Next, the projection $f^4$ will engage with the end $b^3$ of the bar $b$ and lift it against the action of the spring $b^4$, so that the projection $b^2$ will be disengaged from the last tooth $e'$ and will be kept in such a position that it will not reëngage with any of the teeth until the locking device $f$ is released, so that it can assume its normal position. These parts are kept in this position by the projection $h'$ upon the check $h$, this projection being of the same height as the end of the inclined surface $h^2$. The next effect of the check will be for the inclined surface $h^3$ thereof to engage with the end $e^2$ of the bar $e$, and as the check is forced forwardly this will cause the bar $e$ to be forced downwardly.

It will be understood that any convenient means (not shown) may be employed for preventing the bar $e$ from sliding down by gravity, and consequently the bar will be forced to descend only such distance as may be represented by the widest portion of the check $h$. It will be clear that the different checks $h$ may be so designed as to cause the bar to descend a distance represented by the space between two teeth or more, according to the number of measures of liquid that are to be drawn.

When the check is forced entirely through the operating mechanism and out of engagement with the bar $e$ and the locking device $f$, the latter will be forced to descend by the action of the spring $f^2$ and the projection $f^3$ will engage the tooth $e'$ which is nearest to it. This will also cause the bar $b$ to be freed, so that the spring $b^4$ can force the projection $b^2$ into engagement with whatever tooth $e'$ has been lowered into proximity with it. The device is now set so that at any time the number of measures of liquid which are represented by the check applied can be drawn from the faucet. The operation of drawing the liquid will be as follows: The lever $a^2$ is raised, and that will permit one measure of liquid to be withdrawn. It will also force the bar $b$ upwardly, and the projection $b^2$ being in engagement with the tooth $e'$ will force the whole bar $b$ upwardly until the projection $b^2$ is disengaged from the tooth $e'$ or until the bar $b$ reaches the upward proximity of its stroke. These two positions are designed to be coincident for the purpose of effectually checking the operation of the device, and for this purpose an inclined surface $d^5$ is provided upon the plate $d'$. It will be obvious that as the projection $b^2$ is forced upwardly it will be caused upon sliding up the incline $d^5$ to be disengaged from its tooth $e'$, as shown in Fig. 7.

The closing of the faucet $a$ by the lowering of the lever $a^2$ will cause the bar $b$ to be withdrawn to its original position, when the projection $b^2$ will engage with the next tooth $e'$. This operation may then be repeated, and each measure of liquid withdrawn will cause the bar $e$ to be forced upwardly a space represented by one tooth until the end $e^2$ comes into engagement with the stop $n$ and the projection $b^2$ comes into engagement with the last tooth upon the bar. The parts will then resume the position shown in Fig. 8 and the device will be locked until another check is introduced.

Having thus described my invention, I claim as new and desire to secure by Letters Patent—

1. The combination with a faucet having an opening device, of a reciprocable bar connected with the opening device, and check-controlled means for limiting the number of reciprocations of the bar said check-controlled means comprising a ratchet-bar having teeth with which said reciprocable bar is adapted to engage, said ratchet-bar being adapted to be set in different places with respect to said reciprocable bar.

2. In a check-controlled mechanism, the combination with means for permitting the discharge of material from a receptacle, of a reciprocable bar, means for transmitting motion from said first-mentioned means to the bar and moving the bar a certain distance in one direction every time said first-mentioned means is manipulated to permit the material to be discharged, and means for limiting the motion of the bar, said bar being adapted to be set by a check to permit a predetermined number of manipulations of said discharge means.

3. In a check-controlled mechanism, the combination with a liquid-delivering device, of means for opening it to permit a free discharge therefrom, a ratchet-bar having a plurality of teeth adapted to be moved to a position where any one of its teeth connects with said means, means for transmitting motion from the opening means to the ratchet-bar, and means for limiting the extent of motion of the ratchet-bar.

4. The combination of a movable bar having a projection, means for reciprocating the bar, and check-controlled means for limiting the number of reciprocations of the bar, said check-controlled means comprising a ratchet-bar having teeth with which said projection is adapted to engage, said ratchet-bar being adapted to be set in different places with respect to said projection.

5. A check-controlled mechanism comprising a freely-movable ratchet-bar having teeth and adapted to be set in different positions, a reciprocable bar having a projection adapted to engage said teeth whereby the reciprocation of the last-named bar will cause a step-by-step movement of the ratchet-bar, and means for preventing the projection from moving the ratchet-bar more than one step for each reciprocation of the reciprocatory bar.

6. A check-controlled mechanism comprising a reciprocable ratchet-bar having teeth and adapted to be set in different positions, a reciprocatory bar having a projection adapted to engage said teeth whereby the reciprocation of the last-named bar will cause a step-by-step movement of the ratchet-bar, and means for disengaging the projection from the teeth and setting the ratchet-bar.

7. A check-controlled mechanism comprising a ratchet-bar having teeth, a stop, means for setting the ratchet-bar at any distance from the stop, a reciprocatory bar having a projection adapted to engage with said teeth whereby the reciprocation of the last-named bar will cause a step-by-step movement of the ratchet-bar in one direction, and means for preventing the projection from moving the ratchet-bar more than one step for each reciprocation of the reciprocatory bar.

8. A check-controlled mechanism comprising a ratchet-bar having teeth, a reciprocable bar having a projection adapted to engage said teeth, means for preventing the projection from moving the ratchet-bar more than one step for each reciprocation of the reciprocatory bar, and means for preventing the movement of the ratchet-bar in a rearward direction.

9. In a check-controlled mechanism, the combination of a reciprocating bar having a projection, a ratchet-bar having teeth adapted to be engaged by said projection, means for setting the ratchet-bar with respect to the projection, and a locking device adapted to engage said teeth.

10. A check-controlled mechanism comprising a ratchet-bar having teeth, a reciprocable bar adapted to engage said teeth, means for preventing the reciprocable bar from moving the ratchet-bar more than one step for each reciprocation of the reciprocatory bar, and means for preventing the movement of the ratchet-bar in a rearward direction, means for normally forcing the locking-bar into operative position, and means on the locking-bar for disengaging the reciprocable bar from the teeth, when the locking-bar is moved to unlock it from the teeth.

11. In a check-controlled mechanism, the combination of a reciprocable bar, a ratchet-bar, a block upon which said reciprocable bar is mounted, a plate mounted at the side of said block and having an inclined surface, said block and plate constituting ways for the ratchet-bar, means on the reciprocable bar for moving the ratchet-bar intermittently in one direction, means for temporarily preventing the ratchet-bar from moving in the opposite direction, and means for unlocking said last-named means.

12. In a check-controlled device the combination of a ratchet-bar, means for locking it in one position, means for forcing it to move intermittently, and means for unlocking said locking means and for forcing the ratchet-bar in the opposite direction, said last-named means comprising a check having a triangular body and a projection or flange provided with an inclined end.

13. In a check-controlled device, the combination of a ratchet-bar, means for locking it in one position, means for forcing it to move intermittently, and means for unlocking said locking means and for forcing said ratchet-bar in the opposite direction.

14. A check-controlled mechanism, comprising a movable ratchet-bar having teeth and adapted to be set in different positions, a movable bar adapted to engage said teeth, whereby a movement of the last-named bar will cause a step-by-step movement of the ratchet-bar, and means for preventing the movable bar from moving the ratchet-bar more than one step for each movement of the former.

15. A check-controlled mechanism, comprising a movable bar having teeth and adapted to be set in different positions, a second movable bar adapted to engage said teeth, whereby the movement of the last-named bar will cause a step-by-step movement of the first-named bar, and means for disengaging the second bar from the teeth.

16. A check-controlled mechanism, comprising a ratchet-bar having teeth, a stop, means for setting the ratchet-bar at any distance from the stop, a movable bar adapted to engage the said teeth, and means for preventing the last-named bar from moving the first-named bar more than one step for each movement.

In testimony whereof I have signed my name to this specification in the presence of two subscribing witnesses.

JOHN KIES.

Witnesses:
JOHN ZLATNIK, Jr.,
A. W. HAMACHEK.